US012014749B2

(12) United States Patent
Wiranata et al.

(10) Patent No.: US 12,014,749 B2
(45) Date of Patent: Jun. 18, 2024

(54) AUDIO SAMPLES TO DETECT DEVICE ANOMALIES

(71) Applicant: Hewlett-Packard Development Company, L.P., Spring, TX (US)

(72) Inventors: Anton Wiranata, Boise, ID (US); Kathryn Janet Ferguson, Boise, ID (US); Mark Q. Shaw, Boise, ID (US); Chin-Ning Chen, Boise, ID (US); Jan Allebach, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 116 days.

(21) Appl. No.: 17/783,305

(22) PCT Filed: Jan. 10, 2020

(86) PCT No.: PCT/US2020/013123

§ 371 (c)(1),
(2) Date: Jun. 8, 2022

(87) PCT Pub. No.: WO2021/141600

PCT Pub. Date: Jul. 15, 2021

(65) Prior Publication Data

US 2023/0012285 A1 Jan. 12, 2023

(51) Int. Cl.
*G10L 25/51* (2013.01)

(52) U.S. Cl.
CPC .................................... *G10L 25/51* (2013.01)

(58) Field of Classification Search
CPC ....... G10L 19/008; G10L 19/20; G10L 25/51; G10L 19/018; G10L 19/00; G10L 19/24;
(Continued)

(56) References Cited

U.S. PATENT DOCUMENTS 5,130,815 A 7/1992 Silverman et al.
7,734,400 B2 6/2010 Gayme et al.
(Continued)

FOREIGN PATENT DOCUMENTS

JP 08-241121 A 9/1996
JP 3234948 B2 12/2001
(Continued)

OTHER PUBLICATIONS

Koizumi, Y., et al., "Unsupervised Detection of Anomalous Sound Based on Deep Learning and the Neyman-Pearson Lemma," IEEE/ACM Transactions on Audio, Speech, and Language Processing, vol. 27 , Issue 1, Jan. 2019, 13 pages.

*Primary Examiner* — Akelaw Teshale
(74) *Attorney, Agent, or Firm* — Michael Dryja

(57) ABSTRACT

Example implementations relate to audio samples to detect device anomalies. For example, computing device, comprising: a processing resource and a non-transitory computer readable medium storing instructions executable by the processing resource to: generate a matrix of audio information for a plurality of audio samples of a device, select audio information from one of the plurality of audio samples, generate a plurality of principal components for the selected audio information utilizing a principal component expansion, select a principal component from the plurality of principal components based on a quantity of variance, and detect an anomaly of the device based on a comparison between a real time audio sample of the device and the selected principal component.

15 Claims, 5 Drawing Sheets

(58) Field of Classification Search
CPC ... G10L 19/0018; G10L 25/18; G10L 19/167; G10L 25/27
See application file for complete search history.

(56) References Cited

U.S. PATENT DOCUMENTS

| | | | | |
|---|---|---|---|---|
| 2012/0250830 | A1* | 10/2012 | Lam | H04M 3/56 379/32.01 |
| 2016/0119730 | A1* | 4/2016 | Virtanen | H04L 65/80 381/56 |
| 2017/0200092 | A1 | 7/2017 | Kisilev | |
| 2018/0162066 | A1* | 6/2018 | Bruwer | G05B 19/4099 |
| 2018/0350167 | A1* | 12/2018 | Ekkizogloy | B60R 11/0247 |
| 2018/0365695 | A1* | 12/2018 | Liu | G06F 18/22 |
| 2023/0127314 | A1* | 4/2023 | Liu | G06Q 20/4014 705/44 |

FOREIGN PATENT DOCUMENTS

| | | | | | |
|---|---|---|---|---|---|
| JP | 2012-177748 | A | | 9/2012 | |
| JP | 2016-038411 | A | | 3/2016 | |
| JP | 2018081465 | A | * | 5/2018 | |
| WO | 2018/232135 | A1 | | 12/2018 | |
| WO | WO-2018232135 | A1 | * | 12/2018 | G06K 9/00885 |
| WO | 2021/141600 | A1 | | 7/2021 | |

* cited by examiner

590

592 (n rows × 6 columns)

$\mathbf{X} =$

| | | | | | |
|---|---|---|---|---|---|
| 11895 | 23.24793 | 24.93256 | 3 | 0 | 0 |
| 2074 | 23.12136 | 29.61779 | 3 | 0 | 0 |
| 13148 | 21.12528 | 22.71245 | 3 | 0 | 0 |
| 14414 | 15.58967 | 18.45594 | 3 | 1 | 50.72735 |
| 352 | 13.73516 | 22.77757 | 3 | 0 | 0 |

594 mean vector:

$$\vec{\mu} = \frac{1}{n}\sum_{i=1}^{n}\vec{x}_i$$

596 covariance matrix:

$$\mathbf{\Sigma} = \frac{1}{n}\sum_{i=1}^{n}(\vec{x}_i - \vec{\mu})^T(\vec{x}_i - \vec{\mu})$$

598

$$\mathbf{W} = \begin{bmatrix} | & & | \\ \vec{w}_1 & \cdots & \vec{w}_6 \\ | & & | \end{bmatrix} \text{ (6)}$$

599

Fig. 5

AUDIO SAMPLES TO DETECT DEVICE ANOMALIES

BACKGROUND

Mechanical devices can generate sound during operation. For example, a printing device can generate sounds as the printing device generates images on print media. In some examples, the mechanical devices can generate a first sound within a first audio range when the mechanical device is operating normally and generate a second sound within a second audio range when the mechanical device is operating abnormally.

BRIEF DESCRIPTION OF THE DRAWINGS

FIG. 5 illustrates an example of a flow diagram for generating a plurality of principal components, in accordance with the present disclosure.

DETAILED DESCRIPTION

Figure 1:
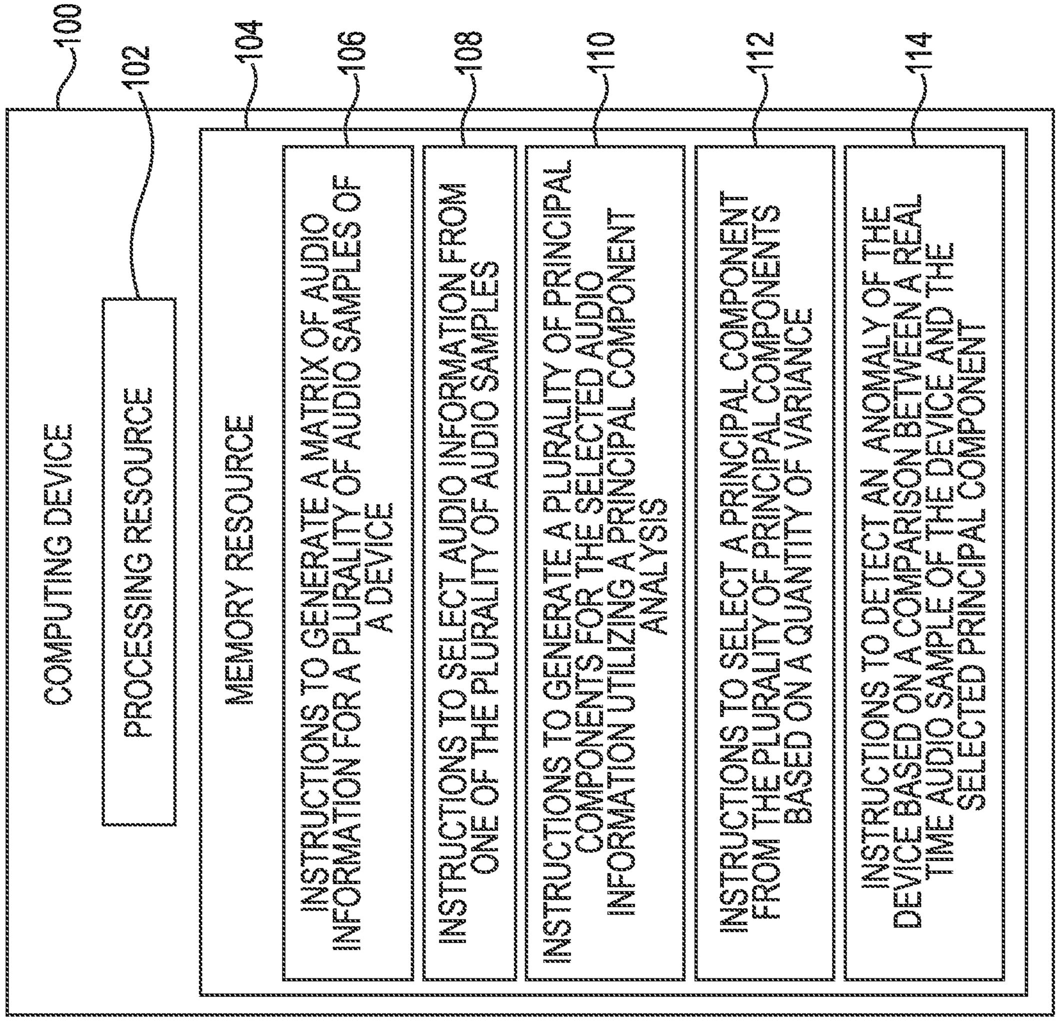
FIG. 1 illustrates an example of a computing device for detecting device anomalies, in accordance with the present disclosure.

Audio samples from a mechanical device can be utilized to determine when the mechanical device is generating an anomaly, malfunctioning, or not operating at a particular set of specifications. For example, audio samples of the mechanical device can be captured when the mechanical device is operating normally (e.g., within a set of specifications, etc.). In this example, the audio samples can be utilized as a training data set for a detection device to determine when the mechanical device is operating abnormally (e.g., malfunctioning, operating outside a particular set of specifications for the mechanical device, etc.). However, in some examples, it can be difficult to generate a training data set with a particular quantity of samples that have a particular variance between the audio samples to provide high quality detection for the detection device.

As used herein, a training data set can include a plurality of data samples that are used as inputs to define normal or functional sounds. The plurality of data samples can be captured from the device when the device is operating normally and utilized within a detection model to detect anomalies in the real time sound generated by the mechanical device. Examples herein describe a printing device as a specific example of a mechanical device. However, the present disclosure is not limited to printing devices. For example, other types of devices that generate noise or sound during operation can be utilized in a similar way as described herein.

The present disclosure relates to generating an audio sample set (e.g., training data set, etc.) for a detection model. As used herein, a detection model can include an anomaly detection model that can determine an anomaly within real time data based on training data provided to the detection model. In some examples, an accuracy of the detection model can be based on a quantity of real positive results, a quantity of false positive results, and/or a quantity of missed positive results. For example, a greater percentage of real positive results compared to false positive results can result in a greater accuracy. In a similar way, a lower quantity of missed positive results can result in a greater accuracy. In these examples, the greater accuracy can be a result from utilizing a sample data set with a relatively high variance. For example, a data set with a greater variance can provide the detection model with a greater accuracy. In some examples, original audio samples can be collected to be utilized as the data samples for the detection model. For example, the detection model can be trained by different augmented datasets and tested with the real printer sound dataset. In some examples, the original audio samples collected from the device can be expanded by augmentation of the original audio samples. In this way, the training data for the detection model can include a relatively greater quantity of variance between the data samples. In some examples, principal component analysis (PCA) can be utilized to extract one principal component from each original audio sample as a feature for the corresponding audio sample.

FIG. 1 illustrates an example of a computing device 100 for detecting device anomalies, in accordance with the present disclosure. In some examples, the computing device 100 can be part of a mechanical device. For example, the computing device 100 can be part of a printing device. In this example, the computing device 100 can include instructions to determine when the printing device is generating an anomaly or malfunctioning based on a sound generated by the printing device. As used herein, an anomaly can include a performance or action that is different than an expected performance or action. In some examples, an anomaly can include a performance under different environmental conditions, which may result in performance that is different than expected. In some examples, the anomaly can include a malfunction of the device. In other examples, the computing device 100 can be a device or system that is remote from the mechanical device. For example, the computing device 100 can be a server resource (e.g., computing resource provided by a remote server, etc.) and/or a cloud resource (e.g., computing resource provided by a cloud server, etc.). In this example, data from the mechanical device can be provided to the remote computing device 100 and the remote computing device 100 can respond to the mechanical device.

In some examples, the computing device 100 can include a processing resource 102 and/or a memory resource 104 storing instructions to perform particular functions. A processing resource 102, as used herein, can include a number of processing resources capable of executing instructions stored by a memory resource 104. The instructions (e.g., machine-readable instructions (MRI), computer-readable instructions (CRI), etc.) can include instructions stored on the memory resource 104 and executable by the processing resource 102 to perform or implement a particular function. The memory resource 104, as used herein, can include a number of memory components capable of storing non-transitory instructions that can be executed by the processing resource 102.

The memory resource 104 can be in communication with the processing resource 102 via a communication link (e.g., communication path). The communication link can be local or remote to an electronic device associated with the processing resource 102. The memory resource 104 includes instructions 106, 108, 110, 112, 114. The memory resource 104 can include more or fewer instructions than illustrated to perform the various functions described herein. In some examples, instructions (e.g., software, firmware, etc.) can be downloaded and stored in memory resource 104 (e.g., MRM) as well as a hard-wired program (e.g., logic), among other possibilities. In other examples, the computing device 100 can be hardware, such as an application-specific integrated circuit (ASIC), that can include instructions to perform particular functions.

The computing device 100 can include instructions 106 stored by the memory resource 104, that when executed by a processing resource 102 can generate a matrix of audio information for a plurality of audio samples of a device. As used herein, a matrix of audio information can include a structured data set that includes columns with corresponding information related to a corresponding audio samples positioned at the rows. In some examples, the matrix can include a plurality of rows that represent a feature vector of the plurality of audio samples and columns of the plurality of audio samples. As used herein, a feature vector can include a vector that contains information describing an object's characteristics based on importance of the characteristics. In some examples, the columns and/or rows can be altered without departing from the present disclosure. That is, the matrix of audio information can be structured with different information located at different columns or rows within the matrix.

In some examples, the matrix of audio information can include original audio samples of the device. For example, an audio recording device (e.g., microphone, etc.) can be utilized to capture sound generated by a printing device when the printing device is operating according to manufacturer settings (e.g., operating normally, operating without malfunctions, etc.). In some examples, audio information can be extracted from the captured sound generated by a mechanical device and the extracted audio information can be organized within the matrix. In some examples, a plurality of audio samples can be captured and organized within the matrix. However, as described herein, a threshold quantity of audio samples or matrix entries may not be met using the original audio samples. That is, the original audio samples may not be enough samples for a training sample that can be utilized by a detection method with relatively high accuracy. Thus, additional samples can be generated to increase the quantity of samples within the matrix.

In some examples, the additional samples can be generated by augmenting or altering the audio information of the original audio samples and using the augmented audio information as additional samples to be organized within the matrix. In some examples, the original audio samples can be utilized to generate a first matrix and the augmented audio information can be utilized to generate a second matrix. In some examples, the first matrix and the second matrix can utilize the same or similar structure. For example, the rows and columns of the first matrix can match or be similar to the rows and columns of the second matrix. In this way, the first matrix can be appended to the second matrix. For example, the second matrix can be appended or coupled to a bottom or end of the first matrix. In this way, an appended matrix can include a first plurality of audio samples can include the original audio samples and a second plurality of audio samples can include the augmented audio samples.

In some examples, the appended matrix that includes the original audio samples and the augmented audio samples may not exceed the threshold quantity of audio samples. In these examples, the computing device 100 can utilize principal component analysis (PCA) to generate principal components that can represent a feature of a corresponding audio sample. In some examples, PCA can be utilized on a feature matrix after the feature matrix has been obtained from a detector. As used herein, PCA can include a statistical procedure that uses an orthogonal transformation to convert a set of observations (e.g., audio data, etc.) of possibly correlated variables (e.g., entities each of which takes on various numerical values) into a set of values of linearly uncorrelated variables called principal components. Utilizing PCA to generate additional principal components for each feature of an audio sample will be discussed in further detail herein.

The computing device 100 can include instructions 108 stored by the memory resource 104, that when executed by a processing resource 102 can select audio information from one of the plurality of audio samples. In previous examples PCA can be utilized on a plurality of samples to generate a plurality of principal components that can range from a relatively high variance to a relatively low variance. However, the present disclosure utilizes PCA separately on the matrix for each input or audio sample. In this way, a plurality of additional audio samples can be generated. The PCA method is described further herein with reference to FIG. 5. Thus, the instructions 108 can select the audio information from one of the plurality of audio samples to be utilized with a PCA method.

The computing device 100 can include instructions 110 stored by the memory resource 104, that when executed by a processing resource 102 can generate a plurality of principal components for the selected audio information utilizing a principal component analysis (PCA). As described herein, PCA can be performed on the selected audio information to generate a plurality of principal components. As used herein, the principal components can include a set of values of linearly uncorrelated variables. In some example, the PCA method can generate the first principal component has the largest possible variance (e.g., accounts for as much of the variability in the data as possible, includes more variability than other principal components, etc.), and each succeeding component in turn has the highest variance possible under the constraint that it is orthogonal to the preceding components (e.g., each succeeding component has lower variability than the first principal component, etc.).

The computing device 100 can include instructions 112 stored by the memory resource 104, that when executed by a processing resource 102 can select a principal component from the plurality of principal components based on a quantity of variance. As described herein, performing PCA on a feature of an audio sample or a plurality of audio samples can generate a plurality of principal components. In addition, each of the plurality of principal components can include a corresponding quantity of variance. In some examples, a principal component can be selected based on the quantity of variance within the principal component. For example, the first principal component that is generated by PCA can be selected when the first principal component includes the greatest quantity of variance compared to the other plurality of principal components. In some examples, utilizing the principal component with a relatively high variance can generate audio samples that include a relatively high variance, which can expand the variance of sounds generated by a mechanical device that are deemed normal or within a particular set of manufacturer specifications. In this way, false positive determinations of a malfunction or anomaly can be decreased and the accuracy of the detection method can be increased.

The computing device 100 can include instructions 114 stored by the memory resource 104, that when executed by a processing resource 102 can detect an anomaly of the device based on a comparison between a real time audio sample of the device and the selected principal component. As used herein, a real time audio sample can include a relatively recent sample collected by an audio recording device. In some examples, the real time audio sample can include an audio sample collected when a customer of the device is utilizing the device. In other examples, the real time audio samples can include operational audio samples that are collected during operation of the device by an end user. As described herein, a detection method can be utilized to compare the real time audio sample to the matrix generated by the selected principal component or the matrix that includes the original audio samples, augmented audio samples, and/or selected principal components.

As described herein, the matrix can include a threshold quantity of audio samples that can be utilized by a detection method to define normal sounds and define threshold quantities for abnormal sounds. In some examples, the matrix can include a relatively high variance of samples and a relatively larger quantity of audio samples compared to utilizing the original audio samples and augmented audio samples. That is, the training period for the detection method can result in more accurate detection of anomalies and/or malfunctions by utilizing the matrix that includes the principal component.

Figure 2:
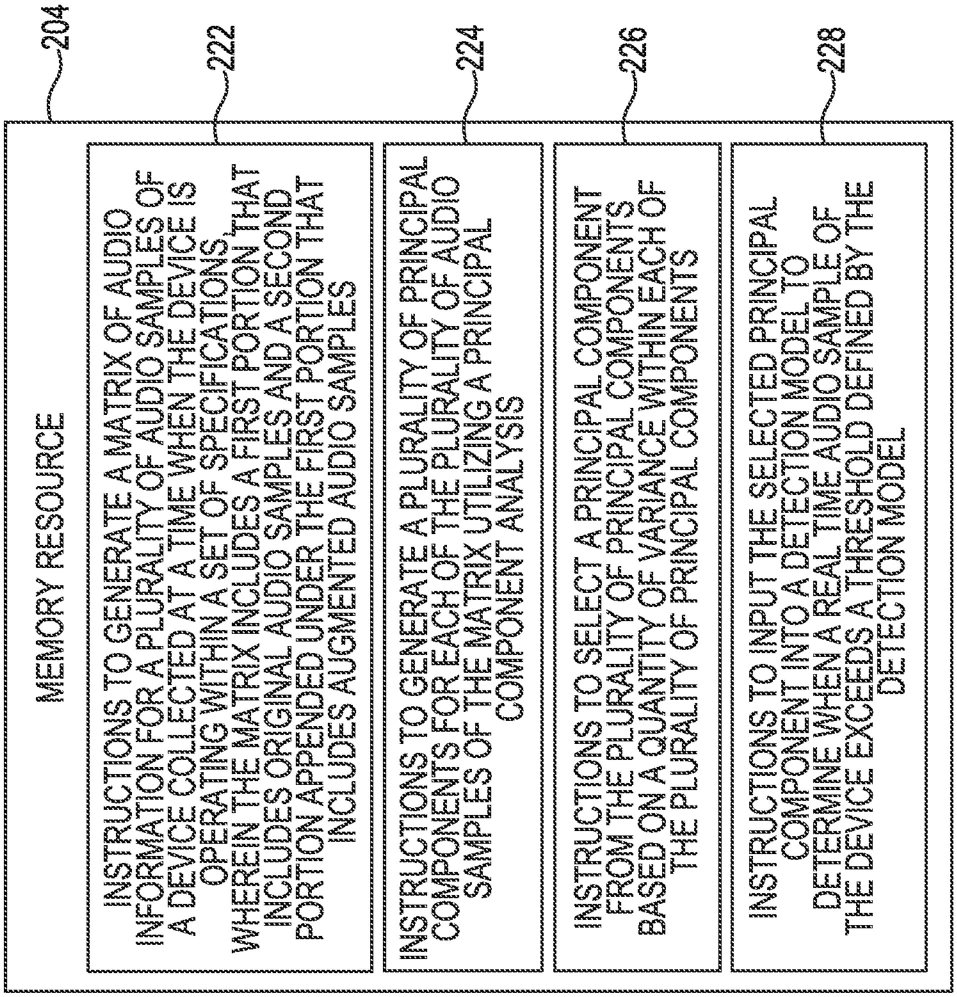
FIG. 2 illustrates an example of a memory resource for detecting device anomalies, in accordance with the present disclosure.

FIG. 2 illustrates an example of a memory resource 204 for detecting device anomalies, in accordance with the present disclosure. In some examples, the memory resource 204 can be the same or similar device as memory resource 104 as referenced in FIG. 1. In some examples, the memory resource 204 can be located within a mechanical device (e.g., printing device, etc.), located remote from the mechanical device, and/or utilized as a cloud resource that is remote from the mechanical device.

The memory resource 204 can be in communication with a processing resource (e.g., processing resource 102 as illustrated in FIG. 1, etc.) via a communication link (e.g., communication path). The communication link can be local or remote to an electronic device associated with the processing resource. The memory resource 204 includes instructions 222, 224, 226, 228. The memory resource 204 can include more or fewer instructions than illustrated to perform the various functions described herein. In some examples, instructions (e.g., software, firmware, etc.) can be downloaded and stored in memory resource 204 (e.g., MRM) as well as a hard-wired program (e.g., logic), among other possibilities.

The memory resource 204 can include instructions 222, that when executed by a processing resource can generate a matrix of audio information for a plurality of audio samples of a device collected at a time when the device is operating within a set of specifications. As described herein, the matrix of audio information can include extracted audio information organized in a matrix structure. The matrix can include a plurality of original audio samples and/or a plurality of augmented audio samples. In some examples, the original audio samples can be audio samples that have been recorded by an audio recording device and the augmented audio samples can be altered versions of the original audio samples. For example, the augmented audio samples can be audio samples that are generated by altering one or more of a Discrete Tone Frequency, a Power at Discrete Tone Frequency Relative to Average, a Power at Discrete Tone Frequency, a power spectral density (PSD) peak width, a modulation frequency, and/or a modulation depth percentage. The features for augmenting or altering the audio samples can include other features of the audio samples to create a greater sample size within the matrix.

In these examples, the matrix can include a first portion that includes original audio samples and a second portion appended under the first portion that includes augmented audio samples. In some examples, the first portion can be a beginning portion of the matrix and the second portion can be an ending portion of the matrix. That is, the second portion can be appended or added to an end portion of the first portion such that the second portion is positioned below the first portion. In some examples, the second portion includes a pitch shift of an original audio file, a time stretch of the original audio file, and a mixture of augmentation of the original file. That is, the second portion can include audio files that have been augmented or altered utilizing an original audio file as a base for the augmentation.

The memory resource 204 can include instructions 224, that when executed by a processing resource can generate a plurality of principal components for each of the plurality of audio samples of the matrix utilizing a principal component analysis. As described herein, previous systems and methods utilized PCA on a plurality of sample data. However, the present disclosure can utilize PCA on each of the plurality of audio samples individually to generate a plurality of principal components based on each of the plurality of audio samples.

The memory resource 204 can include instructions 226, that when executed by a processing resource can select a principal component from the plurality of principal components based on a quantity of variance within each of the plurality of principal components. In some examples, performing PCA on a feature of each of the plurality of audio samples and a corresponding principal component can be selected. In some examples a principal component can be selected based on the variance. As described herein, previous systems and methods may select a principal component with a relatively low variance to obtain a principal component that is relatively close to an original data set.

However, the present disclosure can utilize the principal component with a relatively high variance to prevent false positives within a detection method. For example, the greater variance can allow the detection method to utilize a greater variance within the detection method. In this way, the detection method can compare real time audio samples to a data set with a greater variance to account for different audio changes that may not be a result of a malfunction and/or anomaly, which can lower the occurrence of false positive detections.

The memory resource 204 can include instructions 228, that when executed by a processing resource can input the selected principal component into a detection model to determine when a real time audio sample of the device exceeds a threshold defined by the detection model. As described herein, inputting the selected principal component can include inputting a matrix of audio samples that includes the audio samples within the selected principal component. In this way, each of the plurality of original audio samples can include a corresponding principal component that can include a plurality of augmented audio samples as a training data set.

As used herein, a detection model or detection method can include a method of determining when a data sample (e.g., real time audio sample, etc.) is outside a threshold for a particular feature of the data sample. For example, the detection model can be an anomaly detection model such as, but not limited to, one class support vector machine (OCSVM) and/or random forest (RF). In some examples, a detector can be utilized to obtain feature matrix. In these examples, PCA can be utilized on the feature matrix to obtain a first principal component. In addition, the first principal component can be input into an anomaly detection model instead of inputting the feature matrix into the anomaly detection model which can result in more accurate detection of malfunctions or anomalies of the mechanical device without generating as many false positives.

Figure 3:
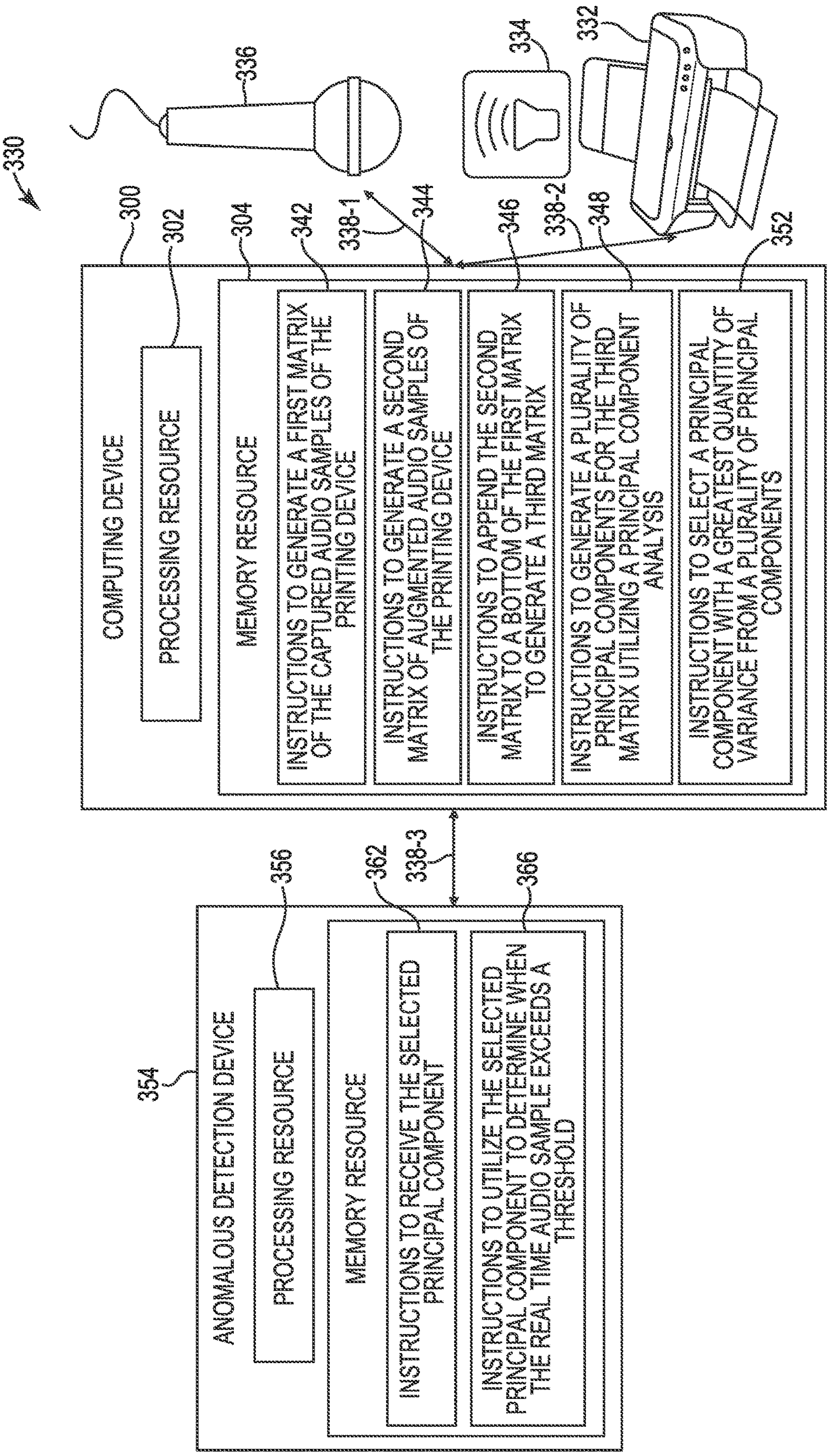
FIG. 3 illustrates an example of a system for detecting device anomalies, in accordance with the present disclosure.

FIG. 3 illustrates an example of a system 330 for detecting device anomalies, in accordance with the present disclosure. The system 330 illustrates a printing device 332 that can generate a sound 334 while operating (e.g., generating images on a print media, etc.). In some examples, the system 330 can include an audio recording device 336. As described herein, the audio recording device 336 can be a microphone or similar device to record audio samples of the sound 334 generated by the printing device 332. In some examples, the printing device 332 and/or the audio recording device 336 can be communicatively coupled to the computing device 300 through a first communication path 338-1 and/or a second communication path 338-2.

In some examples, the system can include a computing device 300 and an anomalous detection device 354. In some examples, the computing device 300 and the anomalous detection device can be part of the same device. In other examples, the instructions of the computing device and anomalous detection device 354 can be generated by a single device or system. In some examples, the computing device 300 can be communicatively coupled to the anomalous detection device 354 through a third communication path 338-3. In this way, the computing device 300 and the anomalous detection device 354 can transfer data (e.g., communication packets) through the third communication path 338-3.

In some examples, the computing device 300 can include a processing resource 302 and/or a memory resource 304 storing instructions to perform particular functions. In some examples, the computing device 300 can be the same or similar device as computing device 100 as illustrated in FIG. 1. In some examples, the system 330 can include an anomalous detection device 354. The anomalous detection device 354 can be a computing device similar to computing device 300. For example, the anomalous detection device 354 can include a processing resource 356 that can be the same or similar to processing resource 302. In addition, the anomalous detection device 354 can include a memory resource 358 that can be the same or similar to memory resource 304. In some examples, the memory resource 358 can include instructions 362, 366 to perform particular functions.

The computing device 300 can include instructions 342 stored by the memory resource 304, that when executed by a processing resource 302 can generate a first matrix of the captured audio samples of the printing device 332. In some examples, the audio recording device 336 can be utilized to collect or capture audio samples from the sound 334 generated by the printing device 332. As described herein, the sound 334 captured by the audio recording device 336 can be sound 334 that is generated when the printing device 332 is operating within a manufacturer's specifications. That is, the printing device 332 can be operating normally when the recording device 336 captures the sound 334 of the printing device 332.

In some examples, the first matrix can be generated by extracting a plurality of features from each of the captured audio samples. The extracted features can be organized as a matrix where the rows represent each of the plurality of audio files and the columns represent the extracted features of the captured audio files. In some examples, the first matrix can be altered to a different type of organizational method, but the organizational method may be consistent with a method utilized to generate other matrices (e.g., second matrix, etc.).

The computing device 300 can include instructions 344 stored by the memory resource 304, that when executed by a processing resource 302 can generate a second matrix of augmented audio samples of the printing device. As described herein, the augmented audio samples can include audio files where a number of features have been altered or augmented from the original audio file. For example, the augmented audio files can include original audio files that have been augmented to alter a number of the features of the original audio file. In some examples, the augmented features can be utilized as a separate audio file and organized within the second matrix. As described herein, the second matrix can be organized such that each augmented audio file can include augmented features for a number of the columns and each of the rows can represent a corresponding augmented audio sample. In some examples, the second matrix can be organized in the same or similar way as the first matrix such that the second matrix can be appended to the end of the first matrix.

The computing device 300 can include instructions 346 stored by the memory resource 304, that when executed by a processing resource 302 can append the second matrix to a bottom of the first matrix to generate a third matrix. As described herein, the second matrix can be coupled to an end or bottom of the first matrix to generate a third matrix that includes the original audio samples and the augmented audio samples. In some examples, the original audio samples can be positioned near a start or at a top portion of the third matrix to prioritize the actual captured data of the printing device 332. In this way, the third matrix can include prioritized audio samples or audio samples that are closest to a real audio sound 334 generated by the printing device 332 during normal operation.

The computing device 300 can include instructions 348 stored by the memory resource 304, that when executed by a processing resource 302 can generate a plurality of principal components for the third matrix utilizing a principal component analysis (PCA). As described herein, PCA can be utilized on each of the audio samples within the third matrix. That is, PCA can be utilized on each of the plurality of original audio samples and each of the plurality of augmented audio samples. In some examples, PCA can be performed on audio samples until a threshold quantity of audio samples are generated. For example, audio samples can be selected from a start of the third matrix and continue to select subsequent audio samples until a particular quantity of audio samples are generated for a training data set for the anomalous detection device 354.

The computing device 300 can include instructions 352 stored by the memory resource 304, that when executed by a processing resource 302 can select a principal component with a greatest quantity of variance from a plurality of principal components. As described herein, each of the plurality of principal components can include a different quantity of variance. In some examples, the first principal component that is generated can include the greatest quantity of variance compared to subsequently generated principal components. In these examples, the first principal component can be selected as the principal component with the greatest quantity of variance. In some examples, the computing device 300 can send or transfer, through the third communication path 338-3, the selected principal components and/or a fourth matrix generated by appending the selected principal component results to the third matrix.

The anomalous detection device 354 can include instructions 362 stored by the memory resource 358, that when executed by a processing resource 356 can receive the selected principal component. As described herein, the anomalous detection device 354 can receive the selected principal component or matrix that includes the selected principal component through the third communication path 338-3 from the computing device 300. In other examples, the anomalous detection device 354 can receive a training data set that includes the selected principal component. For example, the training data set can include a matrix of a plurality of audio samples and/or a plurality of selected principal components. As described herein, a training data set with a greater quantity of samples and/or a greater quantity of variance within the quantity of actual data samples can result in a greater accuracy of anomalous detection by the anomalous detection device 354.

The anomalous detection device 354 can include instructions 366 stored by the memory resource 358, that when executed by a processing resource 356 can utilize the selected principal component to determine when the real time audio sample exceeds a threshold. As described herein, the threshold can be a feature threshold of one of the features extracted from the audio samples. In some examples, the threshold can be generated based on the training data set generated as described herein. For example, the anomalous detection device 354 can have a plurality of thresholds that correspond to a Discrete Tone Frequency, a Power at Discrete Tone Frequency Relative to Average, a Power at Discrete Tone Frequency, a modulation frequency, and/or a modulation depth percentage. In this way, the anomalous detection device 354 can determine when a feature of the sound 334 generated by the printing device 332 is outside a threshold range and thus determine that the printing device 332 is malfunctioning or operating outside a manufacturer's specification.

Figure 4:
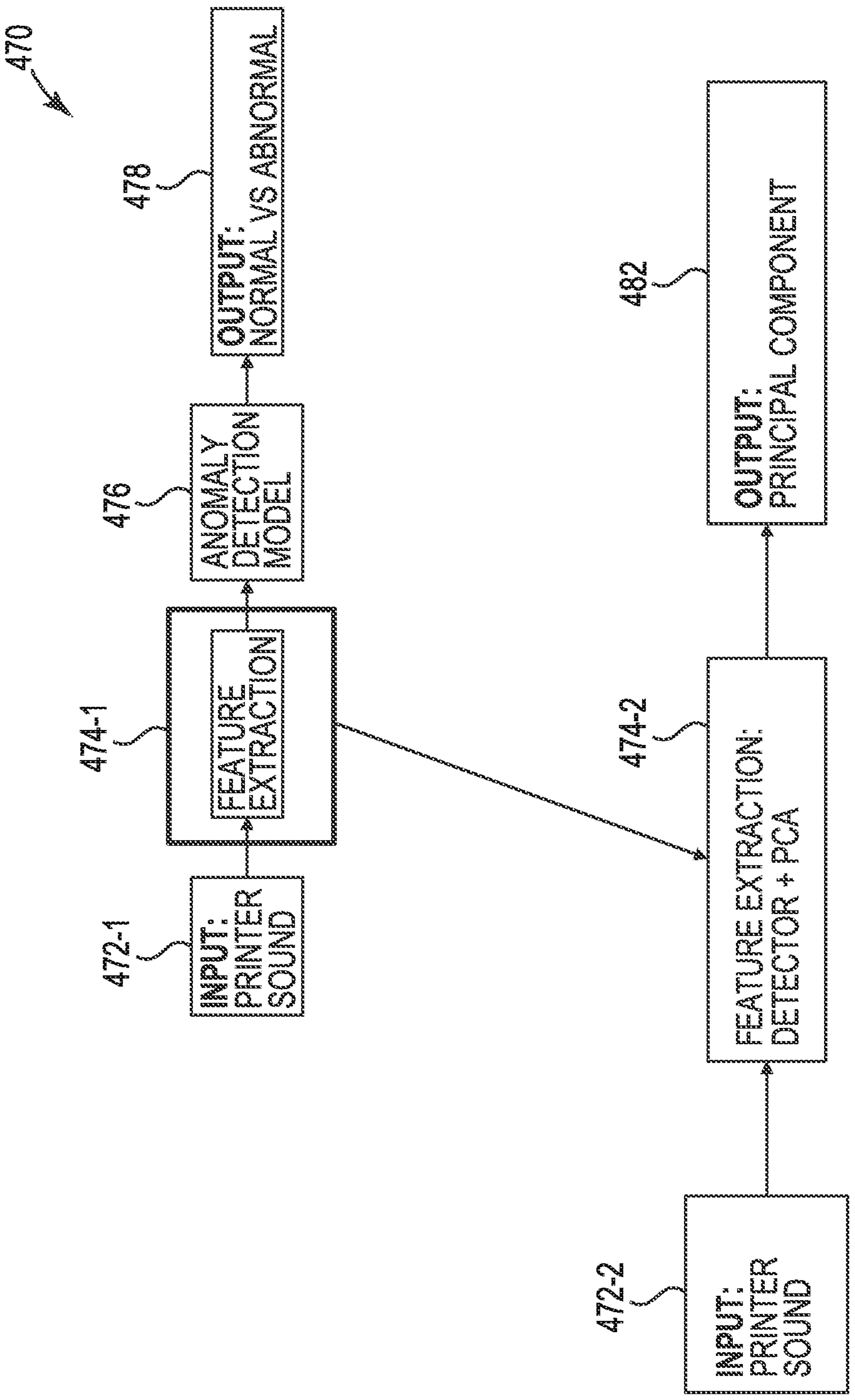
FIG. 4 illustrates an example of a method for detecting device anomalies, in accordance with the present disclosure.

FIG. 4 illustrates an example of a method 470 for detecting device anomalies, in accordance with the present disclosure. In some examples, the method 470 can include a first method to determine normal outputs compared to abnormal outputs at 478 and a second method to determine a principal component at 482. In some examples, the method 470 can be executed by a computing device. (e.g., computing device 100 as referenced in FIG. 1, etc.). For example, each element of the method 470 can correspond to instructions stored in a memory resource (e.g., memory resource 106 as referenced in FIG. 1, etc.) and executable by a processing resource (e.g., processing resource 104 as referenced in FIG. 1, etc.).

The first method can include providing an input at 472-1. As described herein, an input can include a training data set. In some examples, the training data set can include original audio samples that are captured from a device while the device is operating in a normal condition or within parameters defined by a manufacturer of the device. In some examples, the training data set can also include augmented audio samples.

In some examples, the first method can include feature extraction at 474-1. As described herein, feature extraction can include extracting properties from the input audio files. For example, the features can include audio information such as: a Discrete Tone Frequency, a Power at Discrete Tone Frequency Relative to Average, a Power at Discrete Tone Frequency, a power spectral density (PSD) peak width, a modulation frequency, and/or a modulation depth percentage. In some examples, the feature extraction at 474-1 can also include a feature extraction at 474-2 in the second method. For example, the feature extraction at 474-2 can include extracting features from the input at 472-1 and/or at 472-2. As described herein, the features extracted at 474-2 and/or at 474-2 can be utilized to generate a matrix of the features for a plurality of audio samples.

In some examples, the feature extraction at 474-2 can include utilizing PCA on the matrix generated from the plurality of audio samples. As described further herein, PCA can be utilized to generate a plurality of principal components. In some examples, PCA can be performed on each of the plurality of audio samples individually. In some examples, a principal component from the plurality of principal components based on a quantity of variance at 482. For example, a first principal component that is generated by PCA. In this example, the first principal component can include the greatest quantity of variance compared to subsequent principal components generated by PCA.

In some examples, a selected principal component at 482 can be input into an anomaly detection model at 476. As described herein, an anomaly detection model can include a model to determine when a real time audio sample exceeds a feature threshold for one of the extracted features of the training data set. In some examples, the anomaly detection model can include a one class support vector machine (OCSVM) and/or random forest (RF). In some examples, the anomaly detection model can provide an output at 478 and identify if a real time audio sample is classified as normal or abnormal. As used herein, a normal audio sample can indicate that the device is operating normally, and an abnormal audio sample can indicate that the device is operating abnormally. In some examples, the method 470 can also include generating a notification and/or sending the notification about the output at 478 to an end user of the device or administrator of the device.

FIG. 5 illustrates an example of a flow diagram 590 for generating a plurality of principal components 598, in accordance with the present disclosure. In some examples, the flow diagram 590 can represent a method for utilizing PCA on a matrix 592 of features of an audio sample.

The flow diagram 590 can include generating a matrix 592. The matrix can be organized in a plurality of different ways. For example, the matrix 592 can be organized with six columns that each correspond to a particular feature. For example, the columns can include audio features such as: a Discrete Tone Frequency, a Power at Discrete Tone Frequency Relative to Average, a Power at Discrete Tone Frequency, a power spectral density (PSD) peak width, a modulation frequency, and/or a modulation depth percentage. In addition, the rows can correspond to each audio sample utilized to generate the matrix 592. For example, a first portion of the rows can correspond to original audio samples captured from a printing device and a second portion of the rows can correspond to augmented audio samples.

In some examples, the flow diagram 590 can include calculating a mean vector 594. The mean vector 594 can be calculated according to the equation illustrated at 594 and utilizing the variables from the matrix 592. In some examples, calculating the mean vector 594 can include calculating an empirical mean along each row of the matrix 592.

In some examples, the mean vector 594 can be utilized to calculate a covariance matrix 596. The covariance matrix 596 can utilize the mean vector 594 as illustrated by the equation illustrated at 596. In some examples, the covariance matrix 596 can be an auto-covariance matrix, dispersion matrix, variance matrix, or variance-covariance matrix. In some examples, the covariance matrix 596 can include a square matrix that gives the covariance between each pair of elements of a given random vector. As used herein, the covariance includes a measure of the joint variability of two random variables.

In some examples, the covariance matrix 596 can be utilized to generate a plurality of principal components 598. In some examples, the plurality of principal components 598 can be linearly uncorrelated variables. In some examples, the quantity of the plurality of principal components 598 can correspond to the quantity of columns within the matrix 592, For example, when six columns are utilized (as illustrated by the matrix 592) six principal components 598 can be generated.

As described herein, a principal component from the plurality of principal components 598 can be selected. For example, principal component 599 can be selected from the plurality of principal components 598. In some examples, the principal component 599 can be selected based on a quantity of variance compared to the remaining plurality of principal components 598. For example, the principal component 599 can be selected to be utilized when the principal component 599 includes a greater quantity of variance compared to other principal components. In some examples, the principal component 599 can be a first principal component generated by the flow diagram 590, which can correspond to a greatest quantity of variance.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A computing device, comprising:
- a processing resource;
- a non-transitory computer readable medium storing instructions executable by the processing resource to:
  - generate a matrix of audio information for a plurality of audio samples of a device;
  - select audio information from one of the plurality of audio samples;
  - generate a plurality of principal components for the selected audio information utilizing a principal component analysis (PCA);
  - select a principal component from the plurality of principal components based on a quantity of variance; and
  - detect an anomaly of the device based on a comparison between a real time audio sample of the device and the selected principal component.

2. The computing device of claim 1, wherein the matrix of audio information includes original audio samples of the device and augmented audio samples of the device.

3. The computing device of claim 2, wherein the matrix of audio information includes a first portion that includes audio information for the original audio samples and a second portion augmented under the first portion that includes audio information for the augmented audio samples.

4. The computing device of claim 1, wherein the selected principal component includes a greater quantity of variance than the remaining plurality of principal components.

5. The computing device of claim 4, wherein the selected principal component represents the audio information for the plurality of audio samples.

6. The computing device of claim 1, comprising instructions executable by the processing resource to input the selected principal component within an anomalous detection device.

7. The computing device of claim 1, comprising instructions executable by the processing resource to generate a plurality of principal components for each of the remaining plurality of audio samples utilizing the principal component analysis.

8. A non-transitory computer-readable storage medium comprising instructions when executed cause a processor of a computing device to:
- generate a matrix of audio information for a plurality of audio samples of a device collected at a time when the device is operating within a set of specifications, wherein the matrix includes a first portion that includes original audio samples and a second portion appended under the first portion that includes augmented audio samples;
- generate a plurality of principal components for each of the plurality of audio samples of the matrix utilizing a principal component analysis;
- select a principal component from the plurality of principal components based on a quantity of variance within each of the plurality of principal components; and
- input the selected principal component into a detection model to determine when a real time audio sample of the device exceeds a threshold defined by the detection model.

9. The medium of claim 8, wherein the audio information includes a Discrete Tone Frequency, a Power at Discrete Tone Frequency Relative to Average, a Power at Discrete Tone Frequency, a power spectral density (PSD) peak width, a modulation frequency, and a modulation depth percentage.

10. The medium of claim 8, wherein the second portion includes a pitch shift of an original audio file, a time stretch of the original audio file, and a mixture of augmentation of the original file.

11. The medium of claim 8, wherein the matrix includes a plurality of columns that represent a feature vector of the plurality of audio samples and rows of the plurality of audio samples.

12. The medium of claim 8, comprising instructions when executed cause the processor of the computing device to determine a mean vector of the matrix and a covariance matrix of the matrix.

13. A system comprising:
a sound recording device to capture a plurality of original audio samples of a printing device while the printing device is operating within manufacturer specifications;
a computing device comprising a processor and a memory storing instructions executable by the processor to:
augment the original audio samples to generate a plurality of augmented audio samples simulating to increase a quantity of variance among a plurality of audio samples including the original audio samples and the augmented audio samples;
generate a first matrix of the original audio samples of the printing device by extracting features from each original audio sample, wherein the first matrix has a plurality of rows corresponding to the original audio samples and a plurality of columns corresponding to the extracted features;
generate a second matrix of the augmented audio samples of the printing device by extracting the features from each augmented audio sample, wherein the second matrix has a plurality of rows corresponding to the augmented audio samples and a plurality of columns corresponding to the extracted features, the columns of the second matrix respectively corresponding to the columns of the first matrix;
append the second matrix to a bottom of the first matrix to generate a third matrix having a plurality of rows including the rows of the first matrix and the rows of the second matrix and having a plurality of columns respectively corresponding to the columns of the first matrix;
generate a plurality of principal components for the third matrix utilizing a principal component analysis, by performing the principal component analysis for each row of the third matrix; and
select the principal component having a greatest quantity of variance; and
an anomalous detection device to:
receive the selected principal component; and
utilize the selected principal component to determine when a real time audio sample exceeds a threshold.

14. The system of claim 13, wherein the threshold is based on a variance of the selected principal component.

15. The system of claim 13, wherein the anomalous detection device utilizes a one class support vector machine (OCSVM) or random forests (RF) model to determine when the real time audio sample exceeds the threshold.

* * * * *